(12) United States Patent
Cheon et al.

(10) Patent No.: US 7,602,444 B2
(45) Date of Patent: Oct. 13, 2009

(54) SYNCHRONIZATION SIGNAL DETECTION CIRCUIT AND METHOD OF DIGITAL TELEVISION (DTV) RECEIVER

(75) Inventors: Jong-hwan Cheon, Suwon-si (KR); Hyun-bae Jeon, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 828 days.

(21) Appl. No.: 11/248,861

(22) Filed: Oct. 12, 2005

(65) Prior Publication Data
US 2006/0078072 A1   Apr. 13, 2006

(30) Foreign Application Priority Data
Oct. 12, 2004   (KR) ............... 10-2004-0081350

(51) Int. Cl.
*H04N 5/04* (2006.01)
*H04N 5/06* (2006.01)
*H04N 5/44* (2006.01)

(52) U.S. Cl. ............... 348/500; 348/521; 348/725

(58) Field of Classification Search ............. 348/500, 348/507, 508, 521, 536, 537, 725, 726, 614, 348/525, 21; 375/354, 365, 373, 376; *H04N 5/04, H04N 5/06, 5/21, 5/08, 5/44, 5/455*
See application file for complete search history.

(56) References Cited

U.S. PATENT DOCUMENTS

| | | | |
|---|---|---|---|
| 6,356,598 B1 | 3/2002 | Wang | 375/321 |
| 6,614,490 B2 * | 9/2003 | Hong et al. | 348/725 |
| 6,803,966 B2 * | 10/2004 | Hong | 348/500 |
| 7,480,009 B2 * | 1/2009 | Cheon et al. | 348/521 |

FOREIGN PATENT DOCUMENTS

| | | |
|---|---|---|
| KR | 1998-059936 | 7/1998 |
| KR | 2001-0069142 | 7/2001 |

* cited by examiner

*Primary Examiner*—Sherrie Hsia
(74) *Attorney, Agent, or Firm*—F. Chau & Associates, LLC

(57) ABSTRACT

A synchronization signal detection circuit and method of a digital TV (DTV) receiver are provided. The synchronization signal detection circuit determines a precise main path by determining powers in consideration of the influence of multiple paths near signals located at a peak value location and guarantees a stable operation of an equalizer by using error values output from a decoder to generate a synchronization locking control signal. A power signal based on the correlation of the received signal with a PN511 sequence is filtered to compensate for a dynamic multipath distortion (e.g., due to other multipath signals near signals located at a peak value location). The magnitude of the filtered power signal is then compared (e.g., with a predetermined threshold value) to determine the position of the main path (e.g., at the peak value location, or at a pre or post multipath signal location).

45 Claims, 11 Drawing Sheets

SYNCHRONIZATION SIGNAL DETECTION CIRCUIT AND METHOD OF DIGITAL TELEVISION (DTV) RECEIVER

This application claims the priority under 35 U.S.C. § 119 of Korean Patent Application No. 2004-0081350, filed on Oct. 12, 2004, in the Korean Intellectual Property Office, the disclosure of which is incorporated herein in its entirety by reference.

BACKGROUND OF THE INVENTION

1. Field of the Invention

The present invention relates to a digital television (DTV) reception apparatus, and more particularly, to a synchronization signal detection circuit of a DTV receiver.

2. Description of the Related Art

In recent years, the digitalization of broadcast television has been accelerated. Digital broadcast systems developed in Europe have been standardized under Terrestrial Digital Video Broadcasting (DVB-T), which is a standard of digital broadcasting based on orthogonal frequency division multiplexing (OFDM), while digital broadcast systems developed in the United States have been standardized under Vestigial Sideband (VSB). The Advanced Television SubCommittee (ATSC), which is an organization that defines standards for DTV components, has specified the vestigial side band (VSB) signal necessary for transmission of a DTV signal. For those countries which have adopted U.S. DTV reception systems, it is necessary to develop robust DTV reception apparatuses (e.g., DTV receivers and DTV set-top boxes) that can reliably demodulate and decode VSB signals having considerable amounts of noise in a multi-path channel environment.

FIG. 1 illustrates the structure of a standard VSB data frame that is transmitted to and received by a DTV receiver. Referring to FIG. 1, each data frame of the VSB signal is consists of two fields, i.e., an odd field and an even field. Each of the two fields is consists of 313 segments, with a first segment corresponding to a field sync signal. The first segment of each of the odd and even fields (labeled as Field sync #1 and Field synch #2, respectively) contains a field synchronization (field sync) signal (a data-field-synchronization (DFS) signal), and the subsequent segments of each of the odd and even fields contain Data and forward error correction (FEC) codes. Each of the segments of each of the odd and even fields has 832 symbols. The first four symbols of each of the segments of each of the odd and even fields contain a segment synchronization signal (4-symbol data-segment-synchronization (DSS)) sequence generated at levels of +5, −5, −5, and +5.

FIG. 2 is a diagram illustrating the structure of the field synchronization signals in the first segment in each field of the VSB signal of FIG. 1. Referring to FIG. 2, the field sync signal in the first segment of each field also contains a total of 832 symbols, with the first four symbols corresponding to a segment sync signal. In order to make the VSB signal more receivable, training sequences are embedded into the first segment (containing the field sync signal) of each of the odd and even fields of the VSB signal. The field synchronization signal includes four pseudo-random training sequences for a channel equalizer: a pseudo-random number (PN) 511 sequence, comprised of 511 symbols; and three PN63 sequences, each of which is comprised of 63 symbols. The sign of the second PN63 sequence of the three PN63 sequences changes whenever a field changes, thereby indicating whether a field is the first (odd) or second (even) field of the data frame. A synchronization signal detection circuit (see FIG. 3) determines the profile of the amplitudes and positions (phase) of received multi-path signals, using the PN511 sequence, and generates a plurality of synchronization signals necessary for various DTV reception operations, such as a decoding operation, using the synchronization signals.

FIG. 3 is a block diagram of a conventional DTV receiver 300. Referring to FIG. 3, the conventional DTV receiver 300 includes a tuner 310, a demodulator 320, a noise rejection filter (NRF) 330, a synchronization signal detection circuit 340, and a (channel) equalizer 350. The demodulator 320, which demodulates a received converted digital signal into a demodulated digital signal, includes an analog-to-digital converter 321, a filtering and down-sampling unit 322, a symbol timing recovery unit 323, a carrier recovery unit 324, and a direct current (DC) removal unit 329. The filtering and down-sampling unit 322 includes a poly-phase filter 325, a 5.38 MHz down-sampler 326, a matched filter 327, and 2.69 MHz sorter 328. The demodulated digital signal output from the demodulator 320 is input to an equalizer 340 through the noise rejection filter (NRF) 330, and then passes through a forward error correction (FEC) unit (not shown) and is then output from the DTV receiver 300 (to a signal processor, not shown). The demodulated digital signal RD output from the demodulator 320 is also input to the synchronization signal detection circuit 340 that detects the frame sync signals from the demodulated digital signal RD, which is output from the demodulator 320.

An imaginary component signal IMAGINARY output from the filtering and down-sampling unit 322 is input to the carrier recovery unit 324. A real component signal REAL is input to the DC removal unit 329 and to the symbol timing recovery unit 323. The DC removal unit 329 generates a real component signal RD by removing any DC component from the real component signal REAL received from the filtering and down-sampling unit 322.

Because there may be obstacles and reflectors in the wireless DTV propagation channel, the transmitted signal arrivals at the DTV receiver from various directions over a multiplicity of paths. This phenomenon is called multipath. It is an unpredictable set of received distortion filters and/or direct signals, each with its own degree of (amplitude) attenuation and (phase) delay. Thus, multipath will cause amplitude and phase fluctuations, and time delay in the received multipath signals. The multipath phenomenon also affects analog television signals (e.g., received by analog NTSC TV sets) resulting in ghosts: multiple images shifted laterally. Ghosting is one of major causes deteriorating analog television picture quality. The ghost appears as a faint image at a laterally shifted position superimposed in the original picture in the television screen, and is may be caused by a multiple path channel by a reflecting body such as a building, mountain, and airplane.

Ghosts are a problem in digital television (DTV) transmissions as well as in NTSC analog television transmissions, although the ghosts are not seen as such by the viewer of the image televised by DTV. Instead, the ghosts cause errors in the data-slicing procedures used to convert symbol coding to binary code groups. If these errors are too frequent in nature, the error correction capabilities of the DTV receiver are overwhelmed, and there is catastrophic failure in the television image. If such catastrophic failure occurs infrequently, it can be masked to some extent by freezing the last transmitted good TV images, such masking being less satisfactory if the TV images contain considerable motion content. The catastrophic failure in the television image is accompanied by loss of sound. Thus, for DTVs the result of multipath interference can be an unusable signal, even though the main path signal may be strong.

Multipath DTV signals other than (e.g., received before or after) a main (e.g., "peak") received DTV signal are sometimes referred to as "ghost" signals, or pre-ghost signals and post-ghost signals (see e.g., FIG. 5). There are 832 symbols per data segment. So, with the symbol rate being 10.76 MHz, each data segment is of 77.3 microseconds duration. Pre-ghosts can be displaced as much as 6 microseconds from the "main" multipath signal, but typically displacements are no more than 2 microseconds. The ability to defeat multipath interference and pull in DTV stations' transmissions remains central to the evaluation of any DTV receiver.

The synchronization signal detection circuit 340 determines a profile of multi-path signals by calculating correlations among the PN (equalizer training) sequences based on the real component signal RD output from the demodulator 320. Thereafter, the synchronization signal detection circuit 340 selects one of the multi-path signals as the main path signal and generates a synchronization locking control signal LOCK and a plurality of synchronization signals (such as a field synchronization signal and a segment synchronization signal).

The synchronization signal detection circuit 340 of the conventional DTV receiver 300 also decides whether to generate the synchronization locking control signal LOCK. The detected position of the main path signal may vary according to the phase offset of the multi-path signals, and in the case of a loss of the main path signal in a dynamic channel, the synchronization locking control signal LOCK is disabled so that the equalizer 350 stops operating. Additionally, the synchronization signal detection circuit 340 selects a signal corresponding to one of a pre-ghost position, a peak value position, and a post-ghost position in the profile of the multi-path signals as a main path signal. However, the performance of the equalizer 350 is considerably affected by not only signals on the left (pre) and right (post) sides of signals having the peak value but also by a number of other signals adjacent to the multi-path signal having the peak power value. The synchronization signal detection circuit 340 may not be able to detect a dynamic variation of the position of a main path signal and may unnecessarily disable the synchronization locking control signal LOCK so that the equalizer 350 stops operating. The synchronization signal detection circuit 340 determines that the one of the received multi-path signals (e.g., one of A, B, C, D, and E of FIG. 5) that has the greatest (peak) value, (e.g., the multi-path signal B of FIG. 5), as the main path signal without considering the influence on the performance of the equalizer 350. Thus, the synchronization signal detection circuit 340 may adversely affect the operating speed and performance of the equalizer 350, causing the performance of the conventional DTV receiver 300 to deteriorate. Thus, the synchronization signal detection circuit 340 is not optimal for such a dynamic channel environment, and its use may considerably deteriorate the performance of the conventional DTV receiver 300.

SUMMARY OF THE INVENTION

Various embodiments of the present invention provide a synchronization signal detection circuit of a DTV receiver, which can precisely determine a main path by determining the degree to which the power of a multi-path signal having a peak value is affected by other multi-path signals adjacent to the multi-path signal having the peak value, and can assure a reliable operation of a (channel) equalizer by generating a synchronization locking control signal LOCK based on a packet error value ERR received from a (FEC) decoder.

An embodiment of the present invention also provides a synchronization signal detection method (e.g., to be performed in a DTV receiver), which can precisely determine the main path by determining the degree to which the power of a multi-path signal having a peak value is affected by other multi-path signals adjacent to the multi-path signal having the peak value and can assure a stable operation of an equalizer by generating a synchronization locking control signal LOCK based on a packet error value ERR received from a decoder.

According to an aspect of the present invention, there is provided a synchronization signal detection apparatus comprising: A synchronization signal detector configured to receive an input signal that includes a synchronization sequence, the apparatus comprising: a first power calculator that outputs a first power signal based on (a correlation value of) the received input signal; a main path detector that selects the main path signal in the received input signal, wherein the main path detector includes: a first multipath distortion filter configured to filter the first calculated power signal and to output a first filtered power signal; and a main path determination unit that selects a main path position based on the filtered first calculated power signal.

The main path determination unit may be conventional (or may be configured to receive the outputs of two multipath distortion filters), and is configured to output a synchronous signal POS indicating the position of a main path signal in the received input signal based on the magnitude of the filtered first (or a filtered second) calculated power signal.

The first multipath distortion filter may comprises: a shift register having a plurality j+1 of delays each having a delay of a predetermined sample time T, each of which delays and outputs the first power signal, thereby generating a plurality (e.g., j+1=7) of delayed first power signals; a plurality j (e.g., 6) of multipliers configured to multiply each of the delayed powers by a corresponding filter coefficient and outputs a plurality j (e.g., 6) of products; an adder that adds the plurality j (e.g., 6) of products; a subtraction element that subtracts the sum, of products, output by the adder from a predetermined one of the j+1 (e.g., 7) delayed powers and outputs the difference as a determination signal. The main path determination unit determines the position POS of the main path signal when the first filtered power signal is larger than a predetermined threshold value (and/or greater than a second filtered power signal).

According to an aspect of the present invention, there is provided a synchronization signal detection apparatus including: a phase calculator which calculates the difference between the phase of a received signal and the phase of a main path signal and generates the calculated result as a phase offset value PHV for the received signal; a power calculator which calculates the power of the received signal; a main path detector which decides the main path signal based on the calculated power; a synchronization locking controller which counts symbols and segments of the main path signal and generates a synchronization locking control signal LOCK and a count information signal based on the counted results; a direction determiner which generates a field direction signal based on the received signal; a synchronization signal generator which generates a segment synchronization signal for the received signal and a plurality of synchronization signals using the synchronization locking control signal LOCK, the count information signal, and the field direction signal, the synchronization signals being synchronized with the segment synchronization signal; and a comparator which generates a locking cancellation control signal indicating whether a value obtained by accumulating received error values for a predetermined period of time is less than a threshold value. The synchronization locking controller may determine the logic state of the synchronization locking control signal based on the locking cancellation control signal.

The power may include a first power which is obtained by adding the squares of first correlation values for a real component signal and an imaginary component signal of the received signal and a second power which is obtained by adding the squares of first correlation values for a real component signal and an imaginary component signal of another complex signal obtained by delaying the real component signal and the imaginary component signal of the received signal by a predetermined amount of time. The received signal may include a first complex signal that comprises the real component signal and the imaginary component signal of the received signal and a second complex signal that comprises a real component signal and an imaginary component signal obtained by delaying the first complex signal by the predetermined period of time. The main path detector may include: a first multi-path distortion filter which generates a plurality of first delayed powers that are separated from one another by predetermined sample time by delaying the first power by the predetermined sample time, multiplies the first delayed powers by respective corresponding first multiplication coefficients, and generates a first determination signal based on the multiplied results; a second multi-path distortion filter which generates a plurality of second delayed powers that are separated from one another by the predetermined sample time by delaying the second power by the predetermined sample time, multiplies the second delayed powers by respective corresponding second multiplication coefficients, and generates a second determination signal based on the multiplied results; and a main path determination unit which chooses one of the first and second determination signals that is greater than the other, generates the main path signal based on the chosen determination signal, and generates a selection signal indicating based on which of the first and second complex signals the chosen determination signal has been produced. One of the first and second complex signals is chosen according to the selection signal, and the chosen complex signal is used in the phase calculator and the direction determiner as an input signal.

According to another aspect of the present invention, there is provided a digital TV (DTV) receiver. The DTV receiver includes: a demodulator which converts an analog Vestigial Sideband (VSB) signal extracted by a tuner into a digital signal and generates a real component signal and an imaginary component signal by demodulating the digital signal; a synchronization signal detection circuit which determines a main path signal and a field direction signal based on correlation values obtained using the real component signal and the imaginary component signal and generates a phase offset value for the VSB signal, a segment synchronization signal, and a plurality of synchronization signals based on the determined main path signal and the determined field direction signal, the synchronization signals being synchronized with the segment synchronization signal; a phase compensator which compensates for the phase of the real component signal using the phase offset value and outputs the compensated result; an equalizer which filters the signal output by the phase compensator by compensating for distortion of the output signal of the phase compensator and outputs the filtered result; and a decoder which performs an error correction operation on the signal output by the equalizer and outputs an error obtained during the error correction operation. The synchronization signal detection circuit generates a locking cancellation control signal using the error value, and it is determined whether to lock the synchronization signals according to the locking cancellation control signal.

According to another aspect of the present invention, there is provided a method of detecting a synchronization sequence within a received signal, the method comprising: calculating a first power signal based on the received signal; filtering the first power signal to adjust for multipath distortion; determining the position of a main path signal based on the filtered first power signal.

According to another aspect of the present invention, there is provided a synchronization signal detection method. The synchronization signal detection method includes: calculating a difference between the phase of a received signal and the phase of a main path signal and generating the calculated result as a phase offset value for the received signal; calculating a power based on the received signal; generating the main path signal based on the calculated power; counting symbols and segments of the main path signal and generating a synchronization locking control signal and a count information signal based on the counted results; generating a field direction signal based on the received signal; generating a segment synchronization signal for the received signal and a plurality of synchronization signals using the synchronization locking control signal, the count information signal, and the field direction signal, the synchronization signals being synchronized with the segment synchronization signal; and generating a locking cancellation control signal indicating whether a value obtained by accumulating received error values for a predetermined period of time is less than a threshold value; and determining the logic state of the synchronization locking control signal based on the locking cancellation control signal.

According to another exemplary embodiment of the present invention, there is provided a DTV reception method. The DTV reception method includes: converting an analog VSB signal extracted by a tuner into a digital signal; generating a real component signal and an imaginary component signal by demodulating the digital signal; determining a main path signal and a field direction signal based on correlation values obtained using the real component signal and the imaginary component signal; generating a phase offset value for the VSB signal, a segment synchronization signal, and a plurality of synchronization signals based on the determined main path signal and the determined field direction signal, the synchronization signals being synchronized with the segment synchronization signal; compensating for the phase of the real component signal using the phase offset value and outputting the compensated result; filtering the compensated result through distortion compensation and outputting the filtered result; performing an error correction operation on the filtered result and outputting an error obtained during the error correction operation; and determining whether to lock the synchronization signals according to a locking cancellation control signal.

BRIEF DESCRIPTION OF THE DRAWINGS

The present invention will now be described more fully with reference to the accompanying drawings, in which exemplary embodiments of the invention are shown. In the drawings, like reference numerals represent like elements, and.

DETAILED DESCRIPTION OF EXEMPLARY EMBODIMENTS OF THE INVENTION

Figure 4:
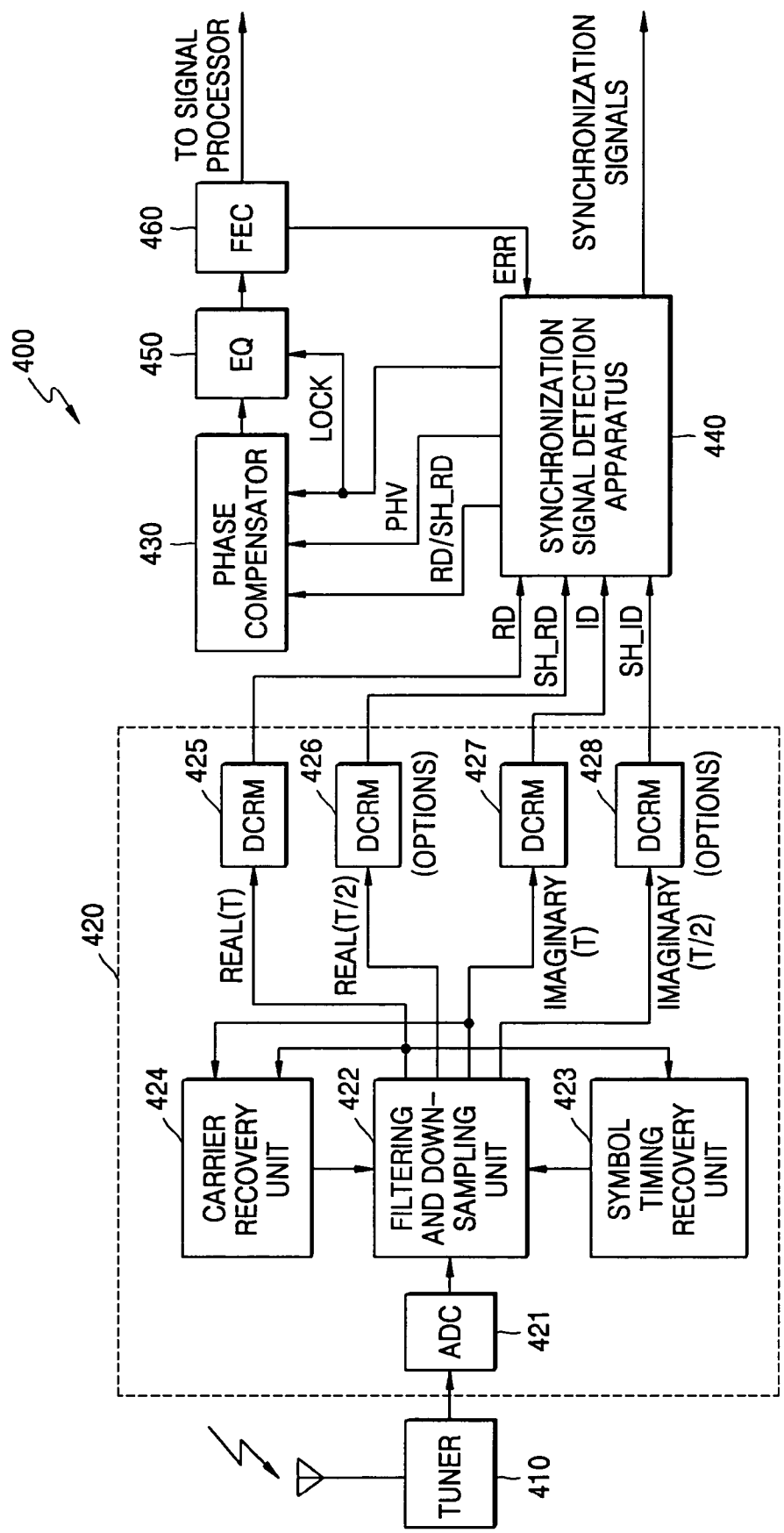
FIG. 4 is a block diagram of a DTV receiver having a synchronization signal detection circuit according to an exemplary embodiment of the present invention.

FIG. 4 is a block diagram of a DTV receiver 400 having a synchronization signal detection circuit 440 according to an exemplary embodiment of the present invention. Referring to FIG. 4, the DTV receiver 400 includes a tuner 410, a demodulator 420, a phase compensator 430, the synchronization signal detection circuit 440, an equalizer 450, and a FEC decoder 460.

A first and a second example of the synchronization signal detection circuit 440 (440a of FIG. 6 & 400b of FIG. 9), which detects VSB synchronization signals (e.g., using a first real component signal RD and a first imaginary component signal ID), will be described later with reference to FIGS. 6 and 9. The tuner 410 receives a high frequency VSB signal (transmitted through the air) via an antenna, tunes the received high frequency VSB signal to a channel allotted for the received high frequency VSB signal, extracts a baseband analog VSB signal from the tuned high frequency VSB signal, and outputs the baseband analog VSB signal.

The demodulator 420 includes an analog-to-digital (A/D) converter 421, a filtering and down-sampling unit 422, a symbol timing recovery unit 423, a carrier recovery unit 424, a first DC removal unit 425, a second DC removal unit 426, a third DC removal unit 427, and a fourth DC removal unit 428. The filtering and down-sampling unit 422 is very similar to the filtering and down-sampling unit 322 of FIG. 3. The A/D converter 421 converts the baseband analog VSB signal output from the tuner 410 into a digital VSB signal. The digital VSB signal is demodulated in a predetermined manner sequentially passing through the filtering and down-sampling unit 422, the symbol timing recovery unit 423, and the carrier recovery unit 424. The filtering and down-sampling unit 422 down-samples the digital VSB signal and outputs a signal having a rate proportional to the symbol rate according to demodulation scheme, (such as a quadrature amplitude modulation scheme, a binary phase-shift keying (BPSK) scheme, or a quadrature phase-shift keying scheme). In addition, the filtering and down-sampling unit 422 generates complex signals by performing a multi-phase filtering operation and a matched filtering (MF) operation on the digital VSB signal.

Thus, the demodulator 420 generates a first complex signal comprised of a real component signal REAL(T) and an imaginary component signal IMAGINARY(T) that are sampled every T seconds, by down-scaling the digital VSB signal. In addition, the demodulator 420 also generates a second complex signal, which is comprised of a real component signal REAL(T/2) and an imaginary component signal IMAGINARY(T/2) that are sampled at every T seconds, by down-scaling the digital VSB signal. The second complex signal is delayed by T/2 seconds compared to the first complex signal.

Thereafter, the first DC removal unit 425 removes a DC component from the real component signal REAL(T) of the first complex signal, thereby generating a first real component signal RD. The third DC removal unit 427 removes a DC component from the imaginary component signal IMAGINARY(T) of the first complex signal, thereby generating a first imaginary component signal ID.

The second DC removal unit 426 removes a DC component from the real component signal REAL(T/2) of the second complex signal, thereby generating a second real component signal SH_RD. The fourth DC removal unit 428 removes a DC component from the imaginary signal IMAGINARY(T/2) of the second complex signal, thereby generating a second imaginary component signal SH_ID.

A second exemplary synchronization signal detection circuit 440b (of FIG. 9) detects the VSB synchronization signals using the first and second real component signals RD and SH_RD and the first and second imaginary component signals ID and SH_ID.

Figure 5:
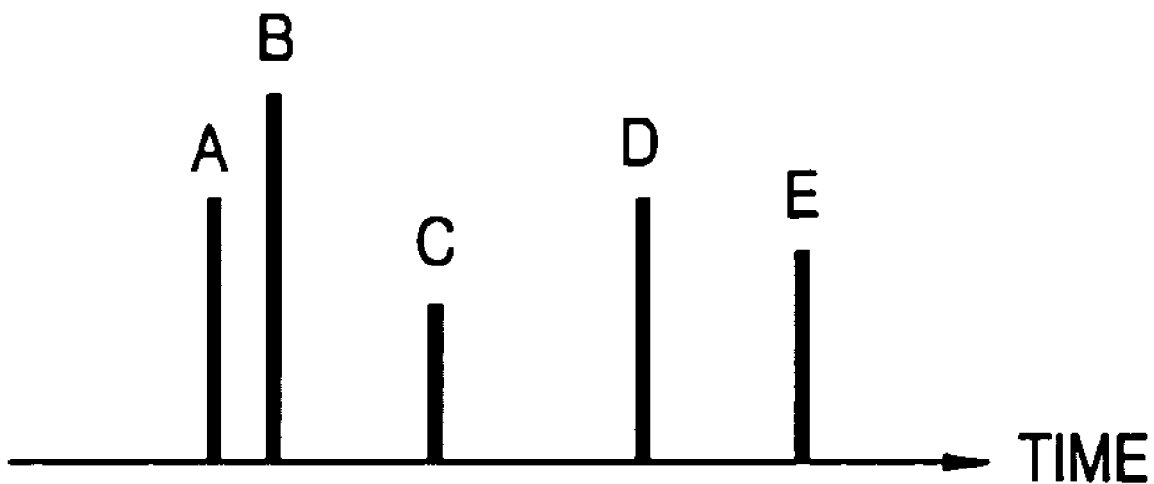
FIG. 5 is a graph illustrating the times and power of typical multi-path DTV signals A, B, C, D & E.

FIG. 5 is a graph profiling the times and power of each of five typical multi-path DTV signals A, B, C, D, & E. The multi-path signals A, B, C, D, and E are input to the DTV receiver 400 at irregular intervals. For example, the first and second real component signals RD and SH_RD and the first and second imaginary component signals ID and SH_ID, which are output from the demodulator 420, may have the profile as the multi-path signals A, B, C, D, and E of FIG. 5. Referring to FIG. 5, one (e.g., B) of the multi-path signals A, B, C, D, and E may be determined as a main path signal based solely on the power each of the multi-path signals A, B, C, D, and E. However, the power of the multi-path signal A affects the power of the multi-path signal B, which is adjacent to the multi-path signal A, so that the powers of the multi-path signals A and B are both increased. Since the amount by which the power of the multi-path signal A increases is larger than the amount by which the power of the multi-path signal B increases, the difference between the powers of the multi-path signals A and B decreases. In addition, since the powers of the multi-path signals C, D, and E do not change while the powers of the multi-path signals A and B increase, it is inaccurate to determine that one of the multi-path signals A, B, C, D, and E is a main path signal solely by reference to the power of each of the multi-path signals A, B, C, D, and E.

In addition, the phases and powers of the multi-path signals A, B, C, D, and E may vary in a dynamic channel. However, as noted above, the conventional synchronization signal detection circuit 340 of the conventional DTV receiver 300 of FIG. 3 is poor at offsetting phase differences among the multi-path signals A, B, C, D, and E in a dynamic channel.

Figure 6:
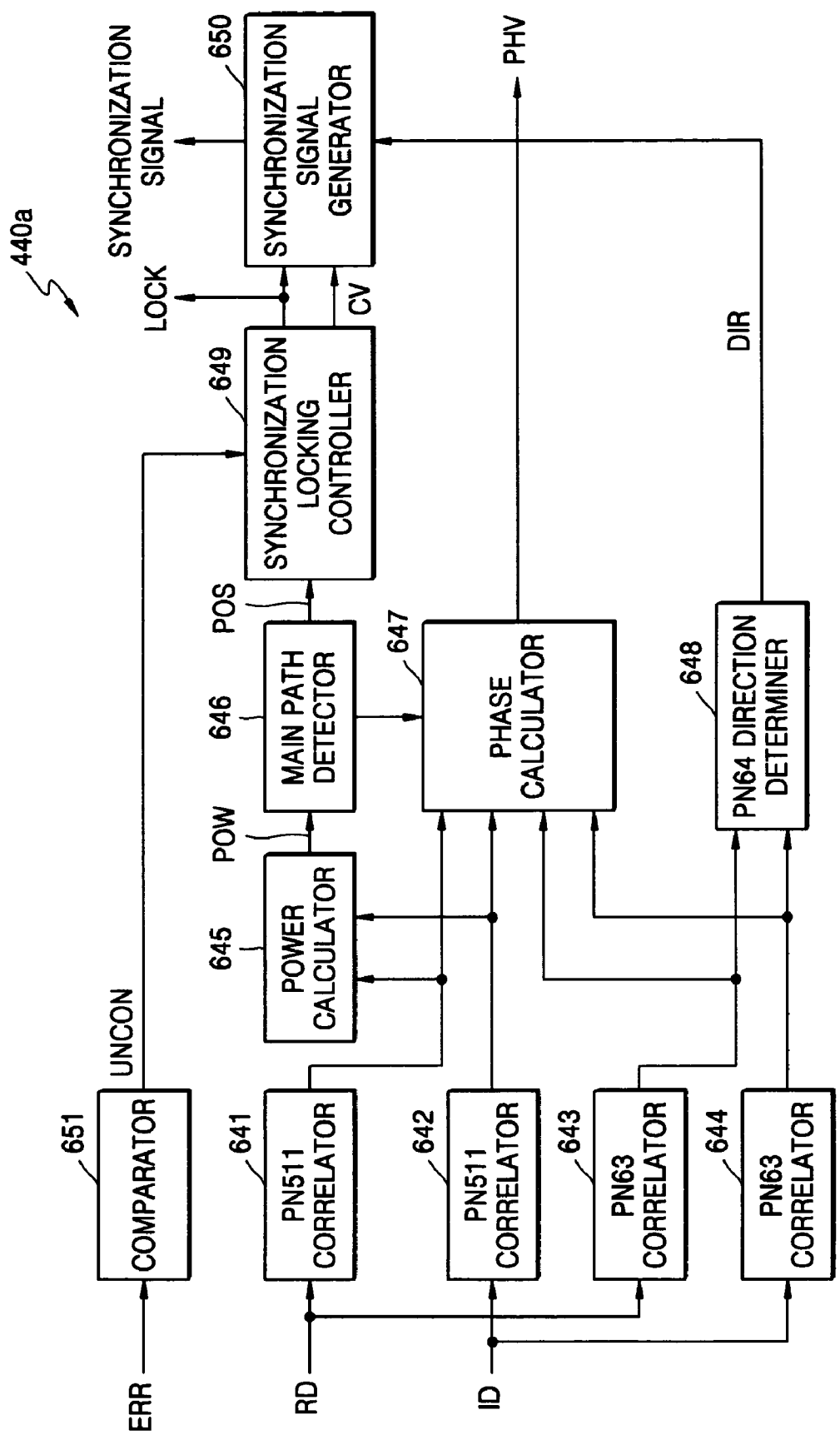
FIG. 6 is a detailed block diagram of an example 440a of the synchronization signal detection circuit 440 of FIG. 4.
Figure 11:
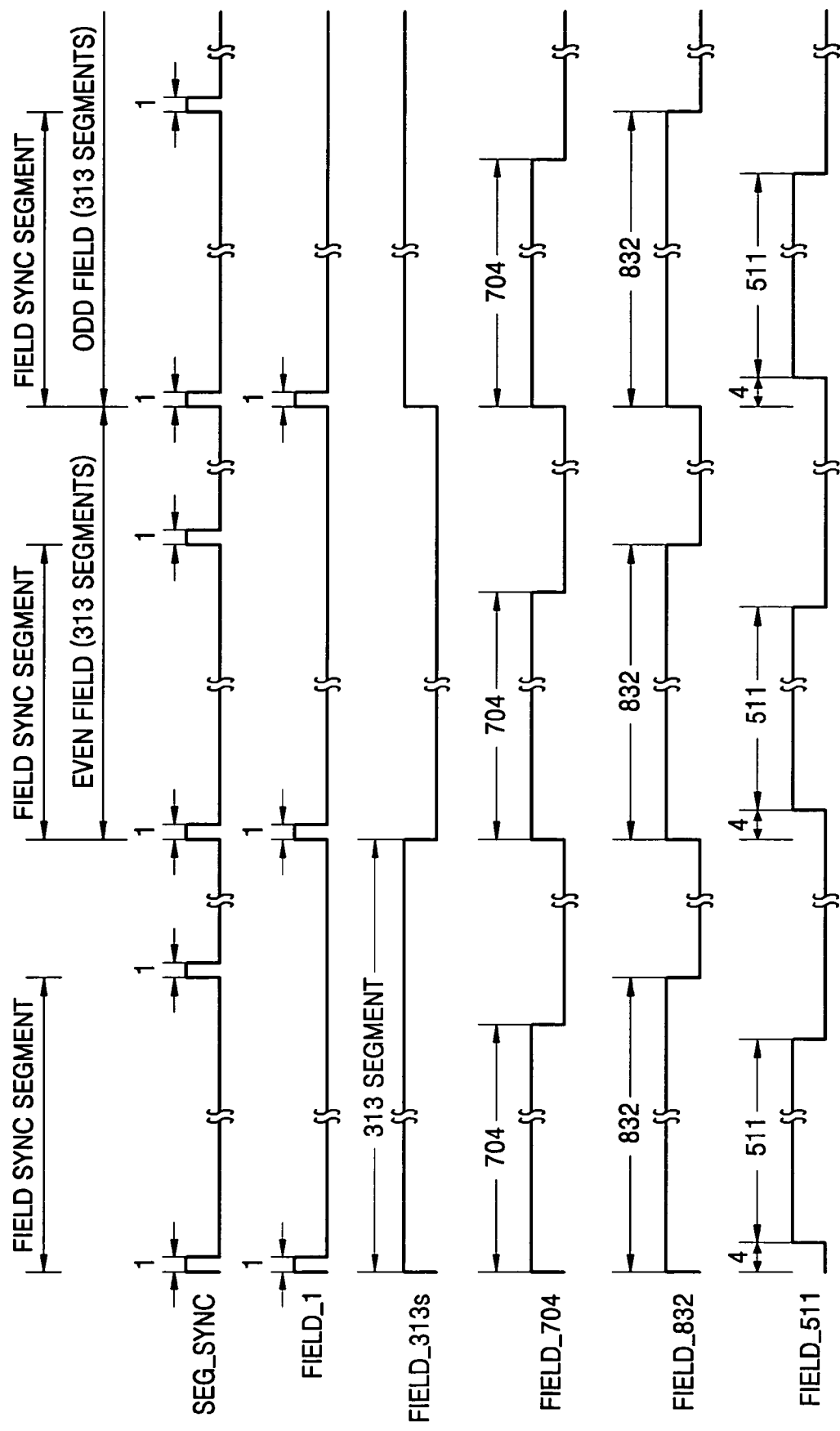
FIG. 11 is a timing diagram illustrating a plurality of synchronization signals generated by the synchronization signal detection circuit 440 of FIG. 4.

FIG. 6 is a detailed block diagram of an example of the synchronization signal detection circuit of FIG. 4. FIG. 11 is a timing diagram illustrating a plurality of synchronization signals generated by the synchronization signal detection circuit of FIG. 4.

Figure 3:
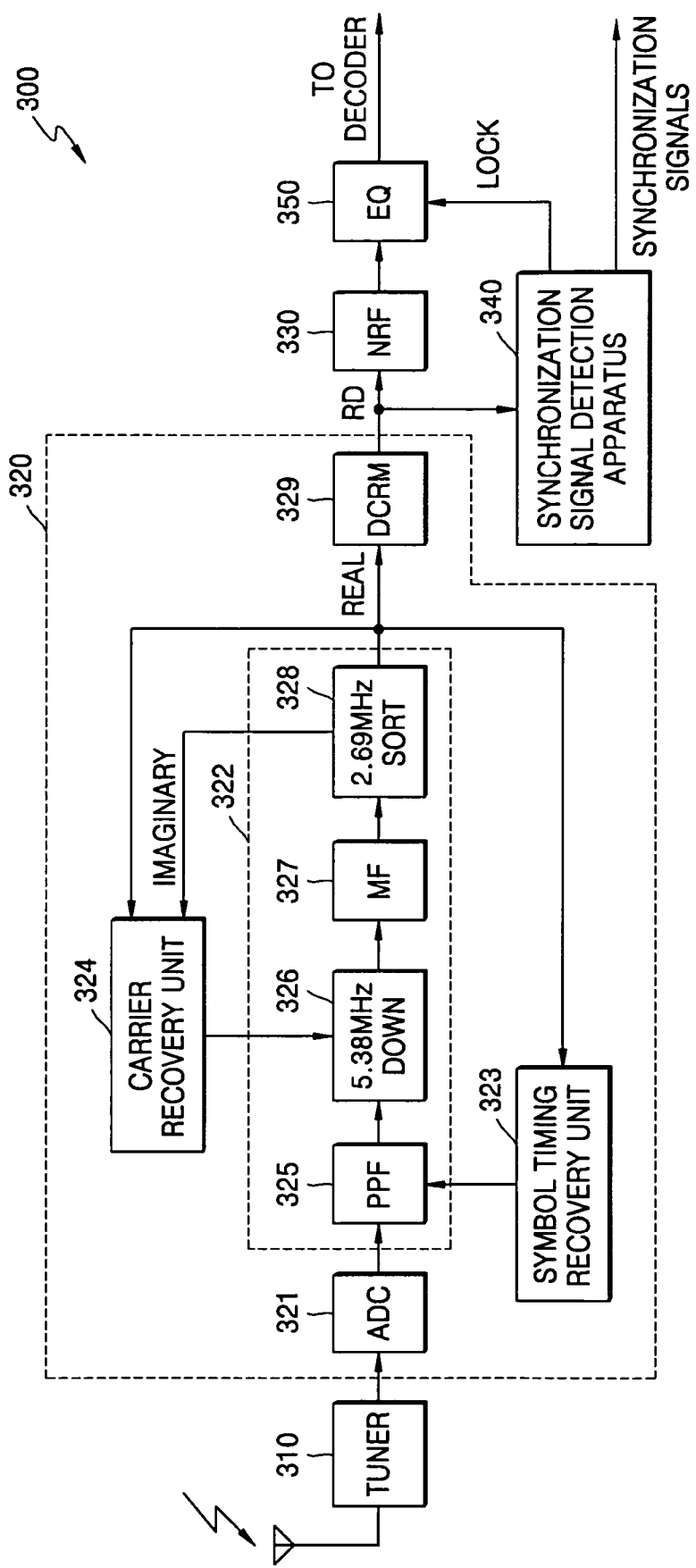
FIG. 3 is a block diagram of a conventional DTV receiver.

The synchronization signal detection circuit 440 (400a of FIG. 6 and 400b of FIG. 9), unlike the conventional synchronization signal detection circuit 340 of FIG. 3, is designed and operates with consideration that the power of a multi-path signal having a peak value is likely to be affected by other multi-path signals adjacent to the multi-path signal having the peak value.

The synchronization signal detection circuit 440 (e.g., 400a of FIG. 6), determines a power POW (by using PN511 PN63 correlation values) obtained using the first and second real component signals RD and SH_RD and the first and second imaginary component signals ID and SH_ID. The PN63 direction determiner of the synchronization signal detection circuit 440 of FIGS. 4 & 6, detects the field direction DIR (e.g., identifying the field sync as either Field Sync #1 or Field Sync #2, based on the polarity of the second PN63 field in the field sync segment). The power POW is used for detecting a main path signal indicated by signal POS with consideration that the power of a multi-path signal having a peak (largest) value is likely to be affected by other multi-path signals adjacent to the multi-path signal having the peak value. PN511 and PN63 correlation values are obtained using a real component signal RD and an imaginary component signal ID. The PN511 and PN63 correlation values are also used for determining a phase offset value PHV.

The synchronization signal detection circuit 440 generates a segment synchronization signal SEG_SYNC ( FIG. 11) of the digital VSB signal and other synchronization signals synchronized with the segment synchronization signal SEG_SYNC based on the detected position POS of the main path signal and the field direction signal DIR (see FIG. 11). The segment synchronization signal SEG_SYNC and the synchronization signals (of FIG. 11) synchronized with the segment synchronization signal SEG_SYNC are used in the DTV receiver 400 for various purposes (e.g., decoding the DTV audio and video signals). The synchronization signal detection circuit 440 generates a locking control signal LOCK based on an error value ERR received from the FEC decoder 460. The equalizer 450 may be turned on or off in response to the locking control signal LOCK. Accordingly, it is possible to assure a stable operation of the equalizer 450 even in a dynamic channel. The synchronization signal detection circuit 440 will be described later more fully with reference to FIGS. 6 through 10.

In an embodiment where the synchronization signal detection circuit 440 has the structure 44a illustrated in FIG. 6, the phase compensator 430 (FIG. 4) receives the first real component signal RD from the synchronization signal detection circuit 440, compensates for the phase of the first real component signal RD by removing a phase offset equivalent to the phase offset value PHV from the first real component signal RD, and then outputs the phase-compensated result.

Figure 9:
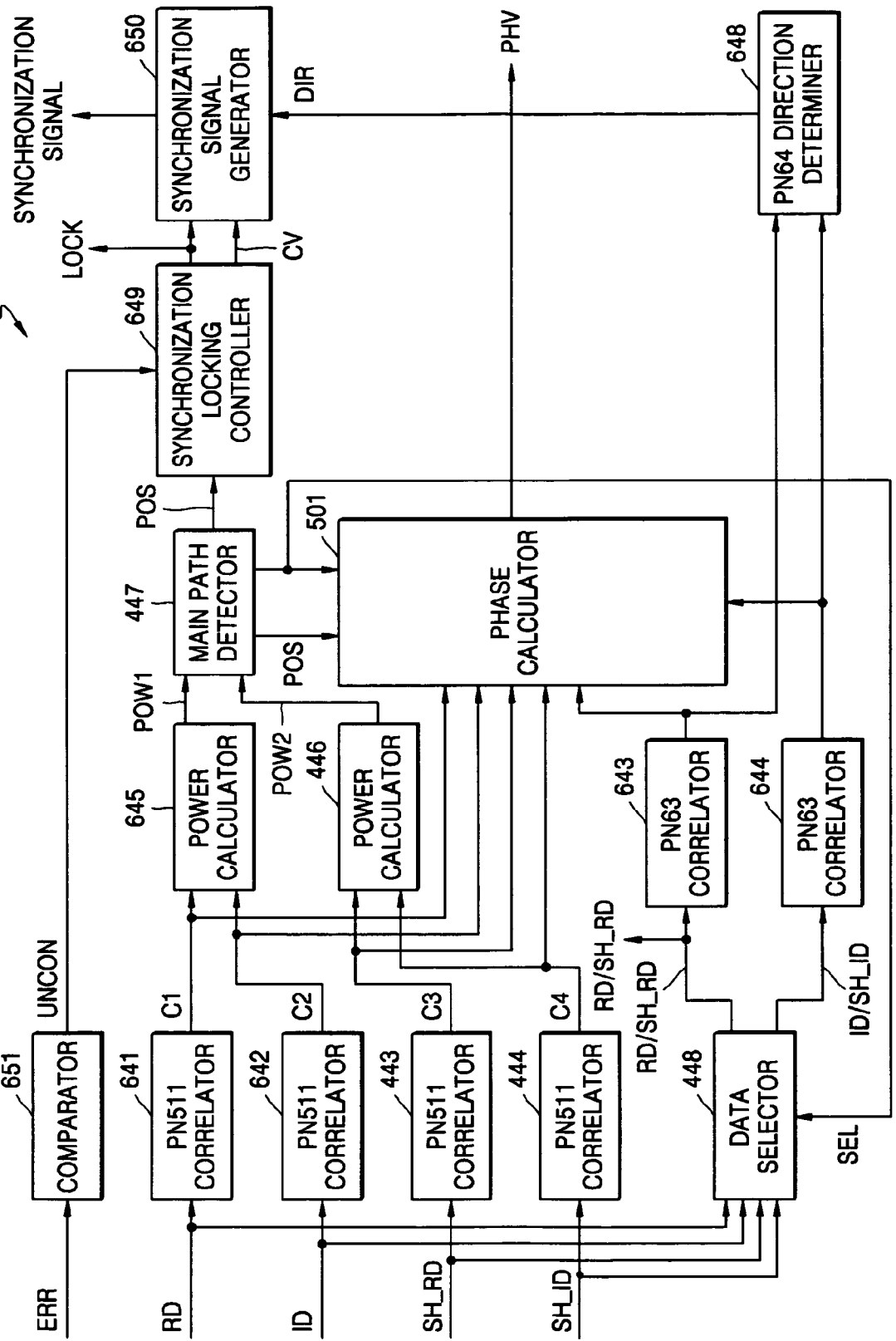
FIG. 9 is a detailed block diagram of another example 440b of the synchronization signal detection circuit 440 of FIG. 4.

In an embodiment where the synchronization signal detection circuit 440 (of FIG. 4) has a structure 440b illustrated in FIG. 9, the synchronization signal detection circuit 440b determines which one of the first and second real component signals RD and SH_RD is to be output to the phase compensator 430. The phase compensator 430 (of FIG. 4) receives a selected one of the first and second real component signal (RD or SH_RD) from the synchronization signal detection circuit 440b, compensates for the phase of the selected received real component signal (RD or SH_RD) by removing a phase offset equivalent to the phase offset value PHV from the selected received real component signal (RD or SH_RD), and outputs the compensated result to the equalizer 450. Here, The equalizer 450 filters the compensated result signal output from the phase compensator 430 using a finite impulse response (FIR) filtering method. The equalizer 450 may be a decision feedback equalizer (DFE), which is an improved version of an FIR equalizer. An equalized signal output from the equalizer 450 is input to the FEC decoder 460. Then, the FEC decoder 460 error-correction-decodes the equalized signal input thereto with the use of, for example, a forward error correction (FEC) decoding method, thereby generating an audio or video signal. The FEC decoder 460 may be a Reed Solomon decoder or a Viterbi decoder. The FEC decoder 460 generates the packet error value ERR in the process of error-correction-decoding the equalized signal input thereto and outputs the packet error value ERR (as feedback) to the synchronization signal detection circuit 440.

FIG. 6 is a detailed block signal of an example 440a of the synchronization signal detection circuit 440 of FIG. 4. Referring to FIG. 6, the synchronization signal detection circuit 440a includes a first PN511 correlator 641, a second PN511 correlator 642, a first PN63 correlator 643, a second PN63 correlator 644, a power calculator 645, a main path detector 646, a phase calculator 647, a PN63 determiner 648, a synchronization locking controller 649, and a synchronization signal generator 650. The method of operation of the synchronization signal detection circuit 440a of FIG. 6 will be described as the follows with reference to FIG. 8.

Figure 8:
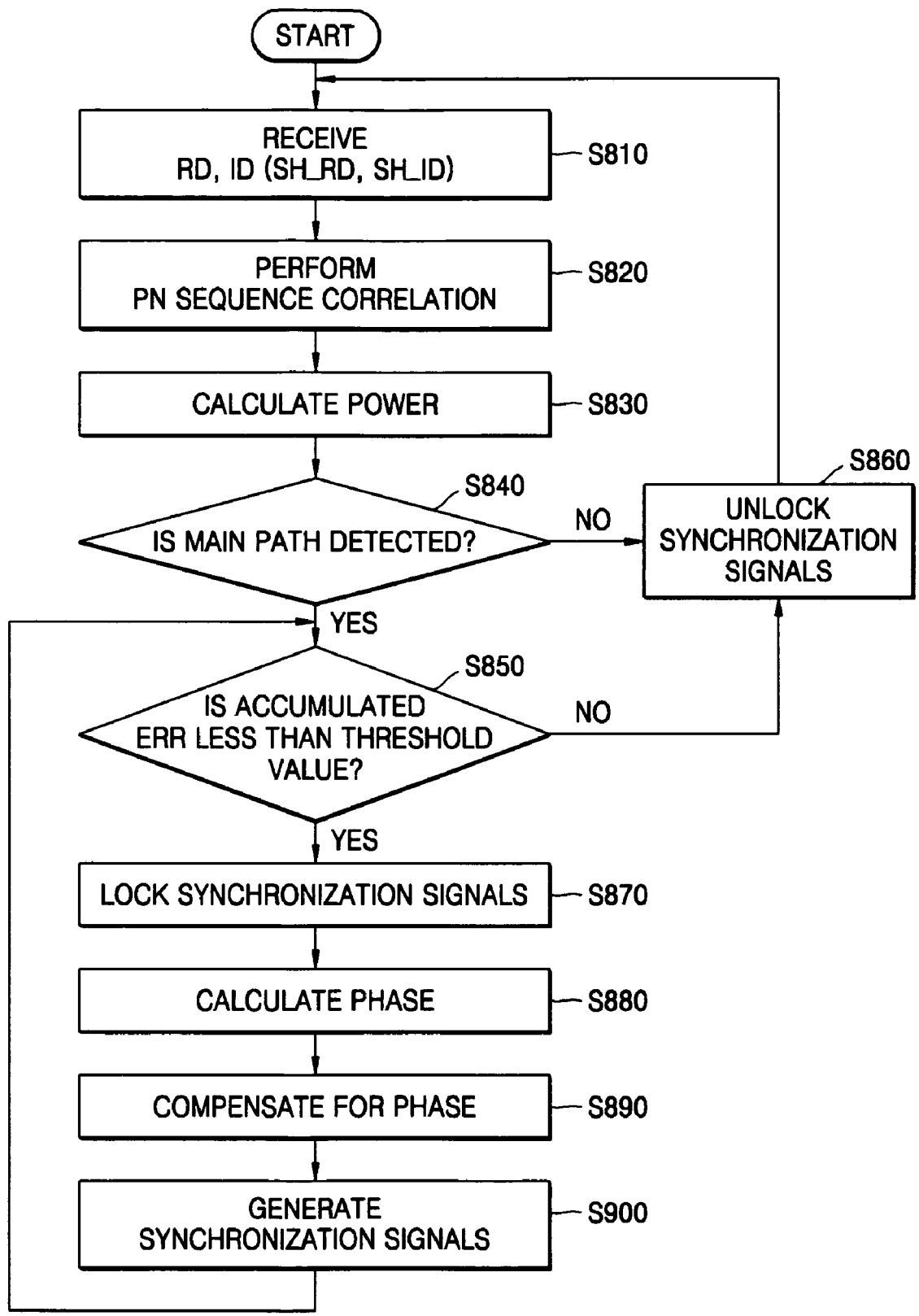
FIG. 8 is a flowchart illustrating the operation of the synchronization signal detection circuit 440 of FIG. 4.

FIG. 8 is a flowchart illustrating the method of operation of the synchronization signal detection circuit 440 of FIG. 4 (e.g., 440a of FIG. 6). Referring to FIGS. 6 and 8, in step S810, the synchronization signal detection circuit 440a (continuously) receives a first real component signal RD and a first imaginary component signal ID, which constitute a first complex signal generated by the demodulator 420 of FIG. 4. In step S820, the first PN511 correlator 641 (FIG.6) (continuously) performs a PN511 sequence correlation operation on the first real component signal RD, thereby generating a first PN511 correlation value; and the second PN511 correlator 642 (continuously) performs the PN511 sequence correlation operation on the first imaginary component signal ID, thereby generating a second PN511 correlation value. Additionally, in step S820, the first PN63 correlator 643 (continuously) performs a PN63 sequence correlation on the first real component signal RD, thereby generating a first PN63 correlation value; and the second PN63 correlator 644 (continuously) performs a PN63 sequence correlation on the first imaginary component signal ID, thereby generating a second PN63 correlation value.

Figure 1:
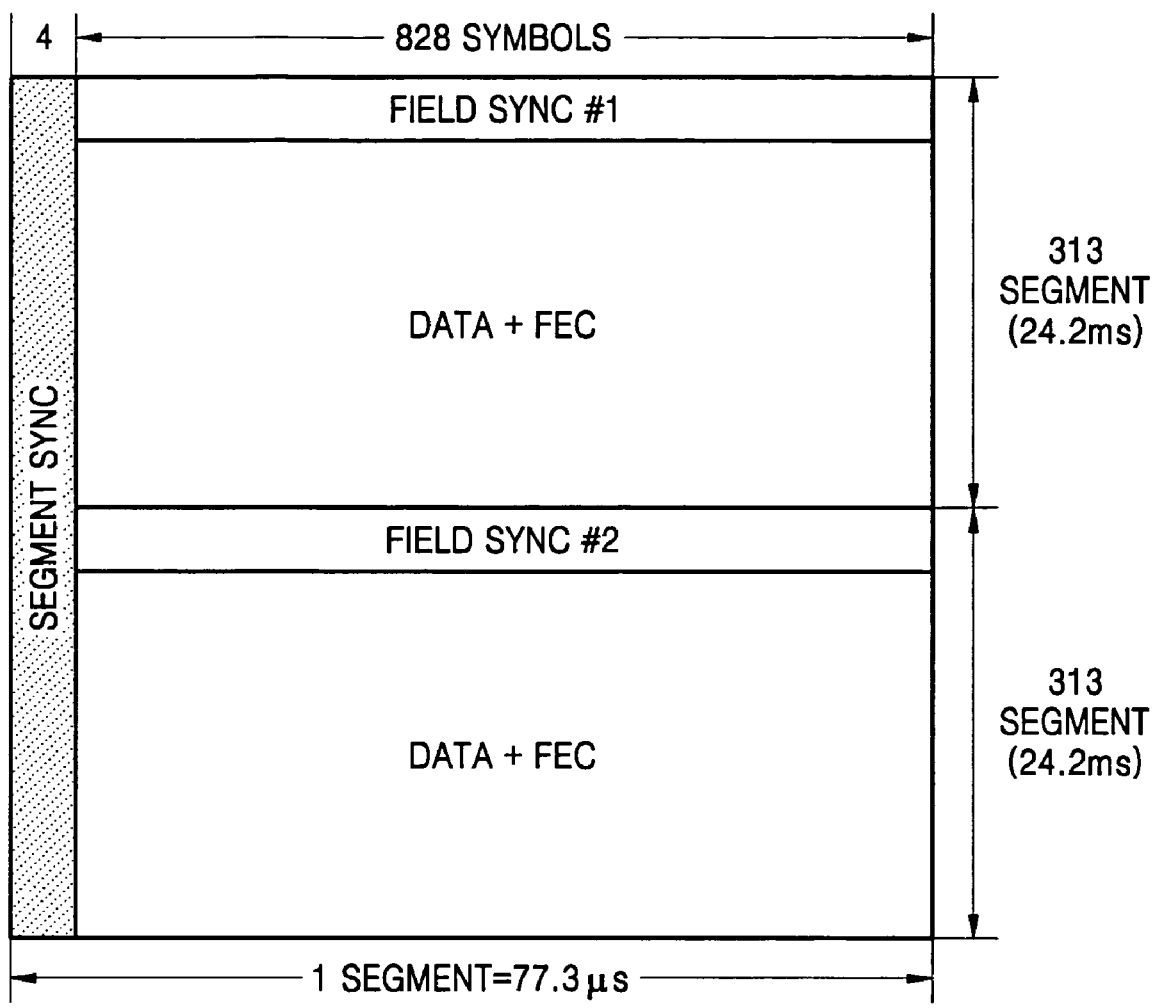
FIG. 1 is a diagram illustrating the structure of a frame of a VSB signal.
Figure 2:
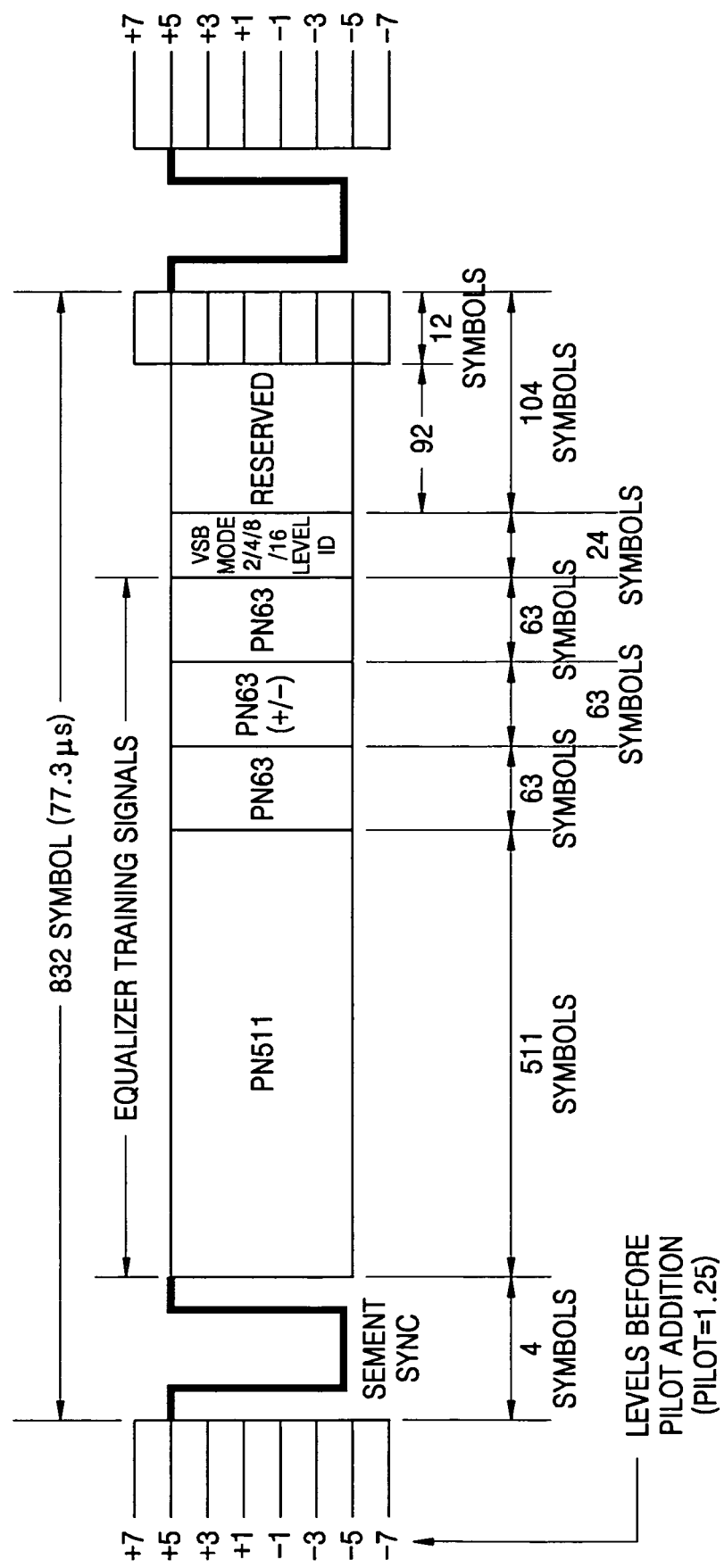
FIG. 2 is a diagram illustrating the structure of a field synchronization signal of the VSB signal of FIG. 1.

The first and second PN511 correlator 641 or 642 performs the PN511 sequence correlation operation in order to detect a beginning portion (sync segment) of a field based on a correlation with the PN511 equalizer training sequence (see FIG. 2). Specifically, the first real component signal RD and the first imaginary component signal ID are respectively input to the first PN511 correlator 641 and the second PN511 correlator 642 and then are delayed by predetermined sample time. The delayed signals comprising a predetermined number of bits are multiplied (in the PN511 correlators) by corresponding register values, and the multiplication results are summed, thereby generating the first and second PN511 sequence correlation values. The register values corresponding with the known value of a PN511 sequence are stored in a predetermined register (not shown). This type of correlation calculation is standard and is known to persons skilled in the art.

The third and fourth PN63 correlators 643 or 644 performs the PN 64 sequence correlation operation in order to determine whether a field currently being received is an odd field or an even field. Specifically, the first real component signal RD and the first imaginary component signal ID are respectively input to the third and fourth PN63 correlators 643 and 644 and then are delayed by the predetermined sample time. The delayed signals comprising a predetermined number of bits are multiplied by corresponding register values, and the multiplication results are summed, thereby generating the first and second PN63 sequence correlation value. The register values corresponding with the known value of a PN63 sequence are stored in the predetermined register (not shown).

In step S830, the power calculator 645 (continuously) calculates a power POW based on the first and second PN511 correlation values. The power POW may be (continuously) calculated by summing the square of the real component signal RD and the square of the imaginary component signal ID.

Figure 7:
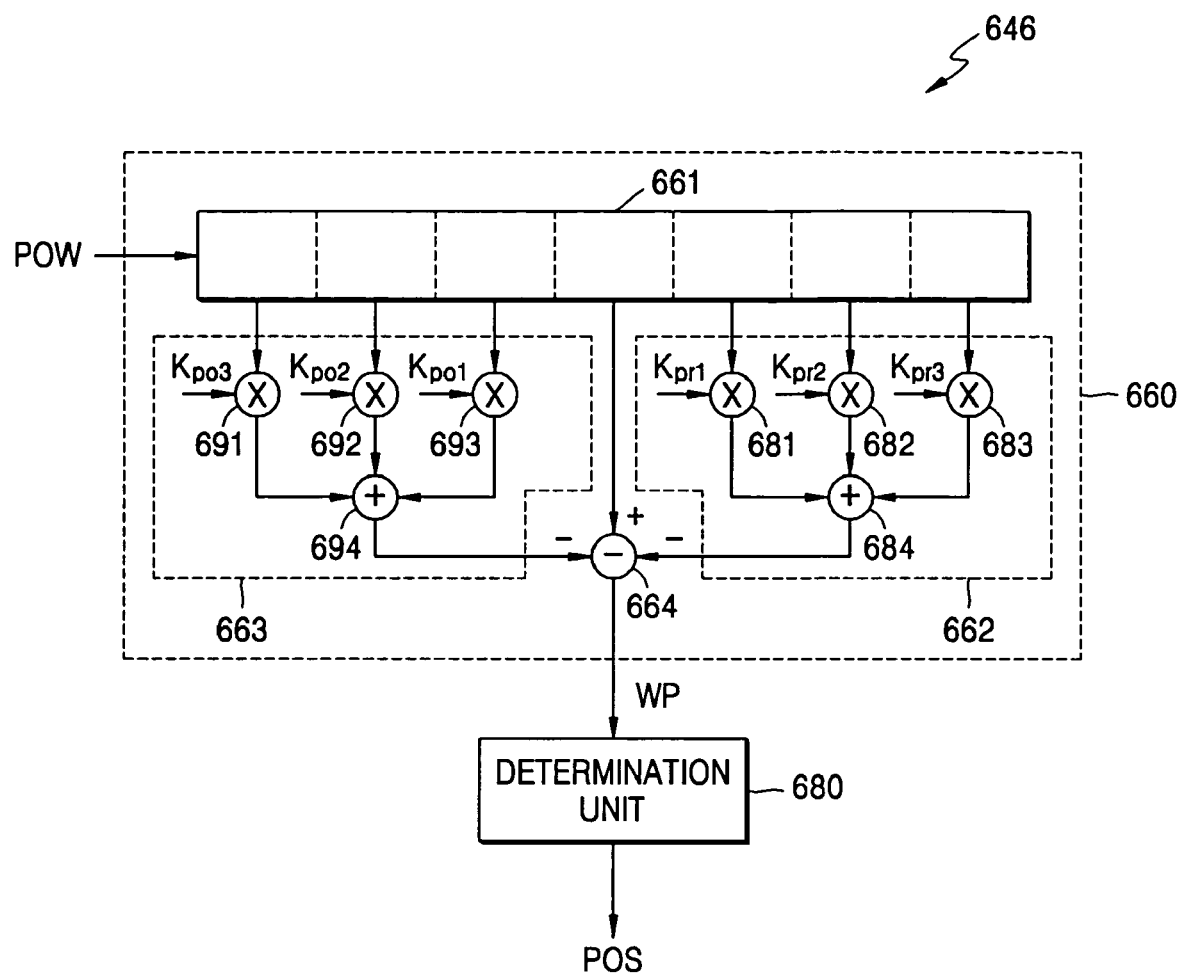
FIG. 7 is a detailed block diagram of a main path detection unit of the synchronization signal detection circuit of FIG. 6.

FIG. 7 is a detailed block diagram of the main path detector 646 of synchronization signal detection circuit 440a of FIG. 6. Referring to FIG. 7, the main path detector 646 includes a multi-path distortion filter 660 and a main path determination unit 680.

The multi-path distortion filter 660 includes a plurality of delay elements (in a shift register) 661 (each having a delay of one sample time T), a first coefficient processing element 662, a second coefficient processing unit 663, and a subtraction element (subtractor) 664. The taps of delay elements (in a shift register) 661 generate a plurality of delayed power POW signal, which are separated from one another by predetermined sample time T. The first coefficient processing element 662 includes a first plurality of multipliers 681 through 683, and an adder 684. The first coefficient processing element 662 multiplies an early portion of the plurality of delayed power POW signals that correspond to pre-ghosts, with the respective predetermined coefficients Kpr1 through Kpr3, and sum the multiplication results and outputs a first summation result. The second coefficient processing unit 663 includes a second plurality of multipliers 691 through 693, and an adder 684. The second coefficient processing unit 663 multiplies a later portion of the delayed power POW signals that correspond to post-ghosts, with the respective predetermined coefficients Kpo1 through Kpo3 and sum the multiplication results and outputs a second summation result. The subtraction element 664 subtracts the first and second summation results output from the adders 684 and 694 from a middle delayed power POW signal value (among the delayed power POW signals) and outputs the subtraction result as a determination signal WP. If the determination signal WP has a value larger than a predetermined (critical, threshold) value, the determination element 680 determines the determination signal WP indicating the main path signal POS.

The predetermined coefficients Kpr1 through Kpr3 and Kpo1 through Kpo3 used in the multi-path distortion filter element 660 may be appropriately determined with consideration of the performance of the equalizer 450. In other words, the determiner 680 determines a maximum among powers POW (e.g., corresponding to multipath signal B of FIG. 5) (received during one field) as the main path signal POS. Alternatively, the determiner 680 may determine one of the pre-ghosts (e.g., multipath signal A of FIG. 5), which are the powers POW signal detected ahead of the peak (largest, maximum) received power POW (e.g., B of FIG. 5), as the main path signal POS. Alternatively, the determiner 680 may determine one of the post-ghosts (e.g., one of C, D or E of FIG. 5), which are the power POW signals received subsequent to the peak (largest, maximum) power POW signal (e.g., B of FIG. 5), or a maximum (e.g., D of FIG. 5) among the post-ghosts as the main path signal POS.

The synchronization locking controller 649 (of FIG. 6) counts the number of fields in which the determined main path signal POS has been detected at the same location, and compares the field count with a threshold value, and generates a synchronization locking control signal LOCK and a count information signal CV. The synchronization locking control signal LOCK may be logic high when the field count is greater than the threshold value; and may be logic low when the field count is less than the threshold value. The count information signal CV comprises a symbol count signal indicating the number of symbols included in the main path signal POS and the number of segments included in the main path signal POS. The symbol count signal is a signal obtained by counting the number of impulses of the main path signal POS for every symbol period; and the segment count signal is obtained by counting the number of symbol count signals (i.e., incremented for every 832-symbols counted) and is increased by 1 for every segment received. The count information signal CV may be reset in units of frames.

However, the generation of the synchronization locking control signal LOCK by the synchronization locking controller 649 is also controlled by a comparator 651. The comparator 651 generates a locking cancellation control signal UNCON indicating whether a value obtained by accumulating (counted) error values ERR within a predetermined period of time is less than a predetermined threshold value.

Accordingly, referring to FIG. 8, in step S850, the synchronization locking controller 649 determines the logic state of the synchronization locking control signal LOCK with reference to (based on) the locking cancellation control signal UNCON. For example, if the FEC decoder 460 consecutively outputs an error value ERR having a predetermined (threshold) level (or a higher) and a (error-count) value, (obtained by accumulating the error values ERR), is less than the threshold value, the locking cancellation control signal UNCON becomes logic low, and accordingly, the synchronization locking control signal LOCK becomes logic high. On the other hand, if the (error-count) value obtained by accumulating the error values ERR is greater than the threshold value, the locking cancellation control signal UNCON becomes logic high, and accordingly, the synchronization locking control signal LOCK becomes logic low.

The synchronization signal generator 650 may be turned on or off according to the logic state of the synchronization locking control signal LOCK. In addition, the phase compensator 430 and the equalizer 450 of FIG. 4 may be turned on or off according to the logic state of the synchronization locking state signal LOCK.

For example, in step S870, if the synchronization locking control signal LOCK is logic high, a plurality of synchronization signals are synchronization-locked, and the synchronization signal generator 650, the phase compensator 430, and the equalizer 450 begin to operate. However, in step S860, if the locking cancellation control signal UNCON is logic high, the synchronization locking control signal LOCK becomes logic low, the synchronization signals are unlocked, and the synchronization signal generator 650, the phase compensator 430, and the equalizer 450 stop operating.

In step S880, the phase calculator 501 calculates the phase of the received VSB signal using first and second PN511 correlation values (C1, C2) output for the first real and imaginary component signals RD and ID of the received VSB signal by the first and second PN511 correlators 641 and 642, calculates a difference between the calculated phase thereof and the phase of the decided main path signal POS, and generates the calculated result as the phase offset value PHV. In order to more precisely calculate the phase of the received VSB signal, the phase calculator 501 may further use PN64 correlation values output for the first real and imaginary component signals RD and ID by the first and second PN64 correlators 643 and 644, as illustrated in FIG. 6 (or, use PN64 correlation values output for the second real and imaginary component signals SH_RD and SH_ID by the first and second PN64 correlators 643 and 644, as shown in FIG. 9).

In step S890, the phase compensator 430 (FIG. 4) receives the first real component signal RD, compensates for the phase of the first real component signal RD by removing a phase offset (equivalent to the phase offset value PHV) from the first real component signal RD, and outputs the compensated first real component signal.

The PN63 direction determiner 648 generates the field direction signal DIR using the PN63 correlation values generated for the first real and imaginary component signals RD and ID of the received VSB signal correlated by the first and second PN64 correlators 643 and 644. For example, if the PN63 correlation values indicate a strong correlation with the expected PN63 sequence of an odd field, the field direction signal DIR may become logic high. On the other hand, if the PN64 correlation values indicate a strong correlation with the expected PN63 sequence of an even field, the field direction signal DIR may become logic low.

Accordingly, in step S900, the synchronization signal generator 650 generates a plurality of synchronization signals based on the synchronization locking control signal LOCK (generated by the synchronization locking controller 649) and the count information signal CV, and the field direction signal DIR (generated by the PN63 direction determiner 648).

Steps S850 through S900 in which the comparator 651 examines error values ERR output from the FEC decoder 460 and the synchronization signal generator 650 generates a plurality of synchronization signals, are repeated while the LOCK and count information signal CV signals are unchanged. The count information signal CV comprises the symbol count signal indicating the number of symbols included in the main path signal POS and the segment count signal indicating the number of segments included in the main path signals POS.

FIG. 11 is a timing diagram illustrating a plurality of synchronization signals generated by the synchronization signal detection circuit 440 of FIG. 4.

Referring to FIG. 11, the synchronization signals generated by the synchronization signal generator 650 include a segment synchronization signal SEG_SYNC; a field synchronization signal FIELD_1; a 313 segment synchronization signal FIELD_313s; a 704-symbol synchronization signal FIELD_704; a 832-symbol synchronization signal FIELD_832; and a 511-symbol synchronization signal FIELD_511. The field synchronization signal FIELD_1, the 313-segment synchronization signal, FIELD_313s, the 704-symbol synchronization signal FIELD_704, the 832-symbol synchronization signal FIELD_832, and the 511-symbol synchronization signal FIELD_511 are synchronized with the segment synchronization signal SEG_SYNC. The segment synchronization signal SEG_SYNC is logic high for the period of one symbol at the time of first symbol of each segment of every field. The field synchronization signal FIELD_1 is logic high for the period of one symbol at the time of the first symbol of each field. The logic state of the 313-segment synchronization signal FIELD_313s alternates between a logic high state and a logic low state for a period of 313 segments, (i.e., one field) and indicates the ODD (Field #1) or EVEN (Field #2) character of the current field. The 704-symbol synchronization signal FIELD_704 is logic high a period of 704 symbols (including 4 symbols for segment synchronization, 511 symbols for a PN511 sequence, and 189 symbols for three PN 64 sequences). The 832-symbol synchronization signal is logic high a period of 832 symbols (i.e., for the period of the first segment in each field). The 511-symbol synchronization signal FIELD_511 is logic high between the time when a PN511 sequence begins and the time when the PN511 sequence ends.

FIG. 9 is a block diagram of an alternative synchronization signal detection circuit 440b according to another exemplary embodiment of the present invention. Referring to FIG. 9, the synchronization signal detection circuit 440b includes a first PN511 correlator 641, a second PN511 correlator 642, a third PN511 correlator 443, a fourth PN511 correlator 444, a first power calculator 645, a second power calculator 446, a main path detector 447, a data selector 448, a first PN63 correlator 643, a second PN63 correlator 644, a PN63 direction determiner 648, a phase calculator 501, a synchronization locking controller 649, and a synchronization signal generator 650. The operation of the synchronization signal detection circuit 440b of FIG. 9 will now be described in detail with reference to FIG. 8.

Referring to FIGS. 8 and 9, in step S810, the synchronization signal detection circuit 440b receives a first complex signal comprising a first real component signal RD and a first imaginary component signal ID and a second complex signal comprising a second real component signal SH_RD and a second imaginary component signal SH_ID from the demodulator 420 of FIG. 4. In step S820, the first PN511 correlator 641 and the second PN511 correlator 642 perform a PN511 correlation operation on the first complex signal, thereby generating PN511 correlation values C1 and C2, respectively, and the third PN511 correlator 443 and the fourth PN511 correlator 555 perform a PN511 sequence correlation operation on the second complex signal, thereby generating PN511 correlation values C3 and C4, respectively.

In step S830, the first power calculator 645 calculates a first power POW1 using the PN511 correlation values C1 and C2. In addition, in step S830, the second power calculator 446 calculates a second power POW using the PN511 correlation values C3 and C4. The calculation of the first or second power POW1 and POW2 may be carried out by adding the square of the first or second real component signal RD or SH_RD and the square of the first or second imaginary component signal ID or SH_ID.

Figure 10:
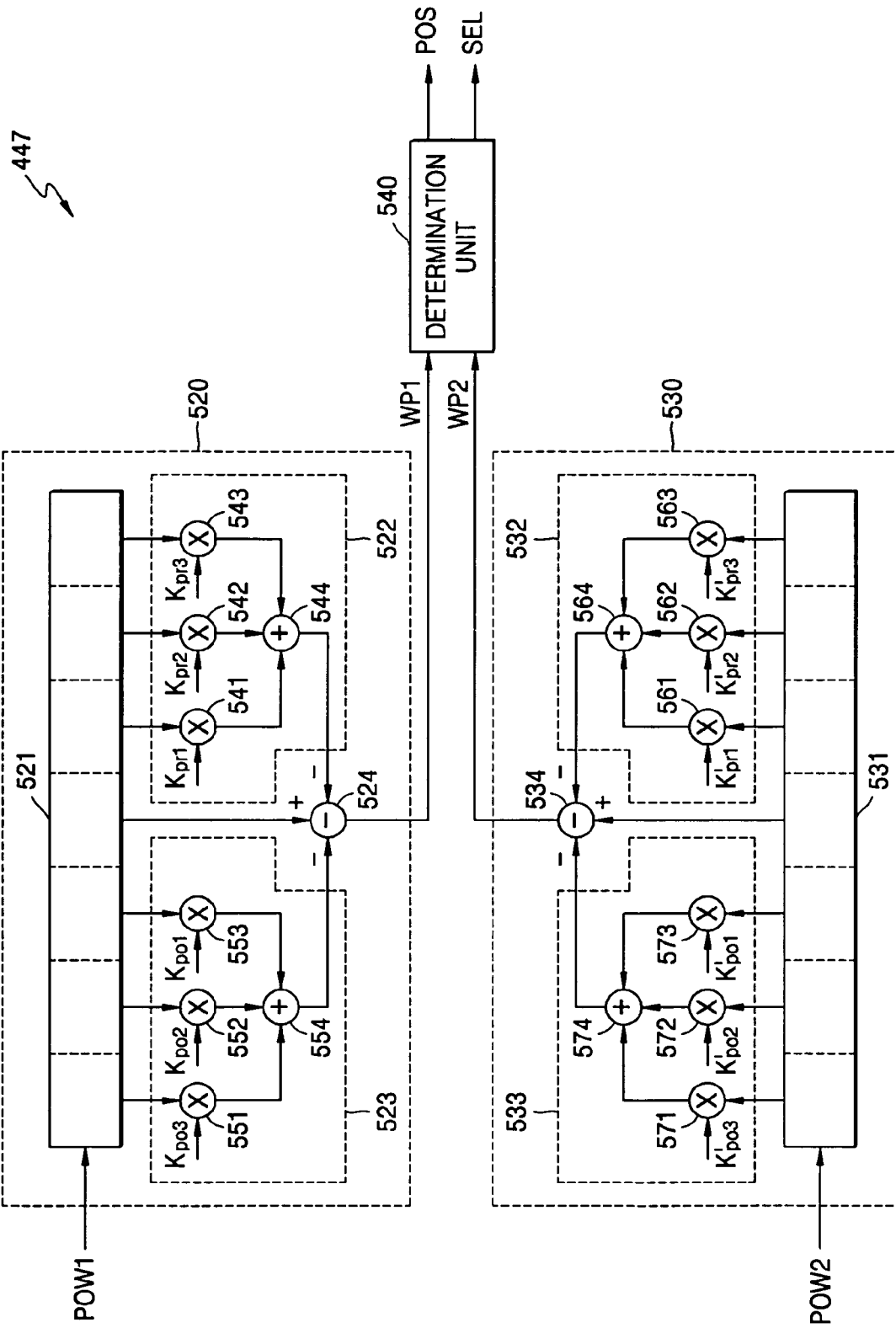
FIG. 10 is a detailed block diagram of a main path detection unit of the synchronization signal detection circuit 440b of FIG. 9.

FIG. 10 is a detailed block diagram of the main path detector 447 of FIG. 9. Referring to FIG. 10, the main path detector 447 includes a first multi-path distortion filter 520, a second multi-path distortion filter 530, and a main path determination unit 540.

The first multi-path distortion filter 520 includes a plurality of delay elements (in a shift register) 521, a first coefficient processing element 522, a second coefficient processing element 523, and a subtraction element 524. The delay elements (in a shift register) 521 delay the first power POW1 (continuously) output by the first power calculator 645 (in FIG. 9), thereby generating a plurality of delayed first powers POW1 (representing powers of pre-ghosts relative to the central (median) delayed first power POW1) which are separated from one another by predetermined sample time T. The first coefficient processing element 522 includes a plurality of multipliers 541 through 543 and an adder 544. The multipliers 541 through 543 multiply multiplication coefficients Kpr1 through Kpr3 by respective corresponding delayed first powers POW1, and the adder 544 sums the multiplied results and outputs the summed result. The second coefficient processing element 523 includes a plurality of multipliers 551 through 553 and an adder 554. The multipliers 551 through 553 multiply multiplication coefficients Kpo1 through Kpo3 by respective corresponding delayed first powers (representing post-ghosts relative to the central (median) delayed first power POW1), and the adder 554 sums the multiplied results and outputs the summed result. The subtraction element 524 subtracts the values output by the adders 544 and 554 from the median of the delayed first powers POW1, thereby generating a first determination signal WP1.

The second multi-path distortion filter 530 includes a plurality of delay elements (in a shift register) 531, a first coefficient processing element 532, a second coefficient processing element 533, and a subtraction element 534. The delay elements (in a shift register) 531 delay the second power POW2 output by the second power calculator 446 (FIG. 9), thereby generating a plurality of delayed second powers POW2 which are separated from one another by the predetermined sample time T. The second coefficient processing element 532 includes a plurality of multipliers 561 through 563 and an adder 564. The multipliers 561 through 563 multiply multiplication coefficients K'pr1 through K'pr3 by respective corresponding delayed second powers POW2 (representing pre-ghosts relative to the central (median) delayed second power POW2), and the adder 564 sums the multiplied results and outputs the summed result. The second coefficient processing element 533 includes a plurality of multipliers 571 through 573 and an adder 574. The multipliers 571 through 573 multiply multiplication coefficients K'po1 through K'po3 by respective corresponding delayed second powers POW2 (representing post-ghosts relative to the central (median) delayed second power POW2), and the adder 574 sums the multiplied results and outputs the summed result. The subtraction element 534 subtracts the values output by the adders 564 and 574 from the median of the delayed second powers POW2, thereby generating a second determination signal WP2.

Referring to FIG. 8, in step S840, the main path determination unit 540 selects the one of the first and second determination signals WP1 and WP2 that is greater than the other and generates a main path signal POS based on the selected determination signal. The main path determination unit 540 also generates a selection signal SEL indicating which of the first and second complex signals the determination signal selected by the main path determination unit 540 is based on. For example, if the first determination signal WP1 is greater than the second determination signal WP2, the selection signal SEL may become logic low. On the other hand, if the first determination signal WP1 is less than the second determination signal WP2, the selection signal SEL may become logic high. In some embodiments, a peak-threshold value may be predetermined such that only if the one of the first and second determination signals WP1 and WP2 that is greater than the other is greater than the peak-threshold value, the main path determination unit 540 may generate the main path signal POS based on the one of the first and second determination signals WP1 and WP2 that is greater than the other.

The multiplication coefficients Kpr1 through Kpr3 and Kpo1 through Kpo3 used by the first multi-path distortion filter 520 and the multiplication coefficients K'pr1 through K'pr3 and K'po1 through K'po3 used by the second multi-path distortion filter 530 may be determined according to the performance of the equalizer 450 (FIG. 4). Accordingly, the main path determination unit 540 can generate a mail path signal POS corresponding to a peak (maximum) (for example, B of FIG. 5) among a plurality of first or second powers POW1 or POW2. Alternatively, the main path determination unit 540 may generate a main path signal POS corresponding to one of a plurality of pre-ghosts (for example, A of FIG. 5) arriving before the peak (maximum) first or second power. Alternatively, the main path determination unit 540 may generate a main path signal POS corresponding to one of a plurality of post-ghosts (for example, one of C through E of FIG. 5) following the peak (maximum) first or second power as the main path signal POS, or a signal corresponding to the post ghost peak (maximum post ghost) among the post ghosts (for example, D of FIG. 5) as the main path signal POS.

Referring to FIG. 9, the data selector 448 receives the first complex signal and the second complex signal from the demodulator 420 (FIG. 4), chooses one of the first and second complex signals in response to the selection signal SEL, and outputs the chosen complex signal. For example, if the selection signal SEL is logic low, the data selector 448 chooses the first complex signal (RD and IC). On the other hand, if the selection signal SEL is logic high, the data selector 448 chooses the second complex signal (SH_RD and SH_ID).

Accordingly, in step S820, the first PN63 correlator 643 performs a PN63 sequence correlation operation on the real component signal of the complex signal output by the data selector 448 (e.g., RD or SH_RD), thereby generating a PN63 correlation value. Meanwhile, the second PN63 correlator 644 performs a PN63 sequence correlation operation on the imaginary component signal of the complex signal output by the data selector 448 (e.g., ID or SH_ID), thereby generating a PN63 correlation value.

The operations of the synchronization locking controller 649 of FIG. 9 and the synchronization signal generator 650 of FIG. 9 are exactly the same as the operations of their respective counterparts illustrated in FIG. 6. In other words, the synchronization locking controller 649 counts a number of fields in which the main path signal POS has been detected at the same location, compares the counted result with a threshold value, and generates a synchronization locking control signal LOCK and a count information signal CV. The generation of the synchronization locking control signal LOCK by the synchronization locking controller 649 is further controlled by a comparator 651. In other words, the comparator 651 generates a locking cancellation control signal UNCON indicating whether a value obtained by accumulating error values ERR for a predetermined period of time is less than the threshold value.

Accordingly, in step S850, the synchronization locking controller 649 determines the logic state of the synchronization locking control signal LOCK with reference to the locking cancellation control signal UNCON. For example, if the FEC decoder 460 (FIG. 4) consecutively outputs an error value ERR having a predetermined level (or higher) and the value obtained by accumulating the consecutive error values ERR is less than the threshold value, the locking cancellation control signal UNCON becomes logic low, and accordingly, the synchronization locking control signal LOCK becomes logic high. On the other hand, if the value obtained by accumulating the error values ERR is greater than the threshold value, the locking cancellation control signal UNCON becomes logic high, and accordingly, the synchronization locking control signal LOCK becomes logic low.

The synchronization signal generator 650 may be turned on or off according to the logic state of the synchronization locking control signal LOCK. In addition, the phase compensator 430 and equalizer 450 of FIG. 4 may be turned on or off according to the logic state of the synchronization locking state signal LOCK. For example, in step S870, if the synchronization locking control signal LOCK is logic high, a plurality of synchronization signals are locked, and the synchronization signal generator 649, the phase compensator 430, and the equalizer 450 begins to operate. However, in step S860, if the locking cancellation control signal UNCON is logic high, the synchronization locking control signal LOCK becomes logic low, the synchronization signals are unlocked, and the synchronization signal generator 650, the phase compensator 430, and the equalizer 450 stop operating.

Based on the selection signal SEL, the phase calculator 501 selects between the PN511 correlation values C1 and C2 (generated from the first complex signal of the received VSB signal) and the PN511 correlation values C3 and C4 (generated from the second complex signal of the received VSB signal) and calculates the phase of the received VSB signal using the selected PN511 correlation values as well as the PN64 correlation values output by the first and second PN64 correlators 643 and 644. In other words, in step S880, the phase calculator 501 calculates the phase of the received VSB signal using the complex signal selected in response to the selection signal SEL, calculates a difference between the calculated phase and the phase of the main path signal POS, and generates the calculated result as the phase offset value PHV. In step S890, the phase compensator 430 (FIG. 4) receives the first or second real component signal RD or SH_RD selected by the synchronization signal detection circuit 440b, compensates for the phase of the selected real component signal by removing a phase offset equivalent to the phase offset value PHV from the selected real component signal, and outputs the compensated real component signal.

The PN63 direction determiner 648 generates a field direction signal DIR using the PN63 correlation values generated for the real and imaginary component signals selected by the data selector 448. (e.g., the first real and imaginary component signals RD and ID of the received VSB signal by the first and second PN64 correlators 643 and 644). For example, if the PN63 correlation values are equivalent to odd field values, the field direction signal DIR may become logic high. On the other hand, if the PN64 correlation values are equivalent to even field values, the field direction signal DIR may become logic low.

Accordingly, in step S900, the synchronization signal generator 650 generates a plurality of synchronization signals (see FIG. 11) based on the synchronization locking control signal LOCK and the count information signal CV (generated by the synchronization locking controller 649) and the field direction signal DIR (generated by the PN63 direction determiner 649). The count information signal CV comprises a symbol count signal indicating the number of symbols included in the main path signal POS and a segment count signal indicating the number of segments included in the main path signal POS. Examples of the synchronization signals generated in the synchronization signal detection circuit 440b are illustrated in FIG. 11.

Steps S850 through S900, in which the comparator 651 examines error values ERR output from the FEC decoder 460 and the synchronization signal generator 650 generates a plurality of synchronization signals, are repeated.

As described above, the synchronization signal detection circuit 440b in the DTV receiver 400 calculates the first and second powers POW 1 and POW2 based on the PN511 and PN63 correlation values generated for the first complex signal or the second complex signal, determines the main path signal POS based on the first and second powers POW1 and POW2 (with consideration of the influence of multiple paths), and generates a plurality of synchronization signals required for performing various DTV operations, for example, audio and video decoding operation. The PN511 and PN63 correlation values are used for determining the phase offset value PHV, and the phase offset value PHV is used by the phase compensator 430 (FIG. 4) to perform a phase compensation operation through phase offset removal. The synchronization locking control signal LOCK generated based on error values ERR output from the FEC decoder 460 may be used for controlling the turning on or off of the equalizer 450.

As described above, the DTV receiver according to embodiments of the present invention determines a main path, generates a plurality of synchronization signals, and compensates for the phase of a received VSB signal with consideration of the influence of multiple paths (e.g., signals near signals at a peak value location). Thus, a DTV receiver according to embodiments of the present invention can stably detect the plurality of VSB synchronization signals regardless of the influence of multiple paths. In addition, a DTV receiver according to embodiments of the present invention generates a locking control signal based on error values output from a FEC decoder, thereby guaranteeing the stable operation of an equalizer. Thus, according to embodiments of the present invention, it is possible to enhance the convergence speed and performance of the equalizer.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, the two (e.g., three-input) adders in each of the multi-path distortion filters (660 of FIG. 7 and 520, 530 of FIG. 10) may be combined to form a single (e.g., six-input) adder; and the number of delay elements, and corresponding multipliers and adders, may be decreased or increased in one or more directions (pre-ghost or post-ghost).

What is claimed is:

1. A synchronization signal detection apparatus comprising: A synchronization signal detector configured to receive an input signal that includes a synchronization sequence, the apparatus comprising:

a first power calculator that outputs a first power signal based on the received input signal;

a main path detector that selects the main path signal in the received input signal, wherein the main path detector includes:

a first multipath distortion filter configured to filter the first calculated power signal and to output a first filtered power signal; and a main path determination unit that selects a main path position based on the filtered first calculated power signal.

2. The apparatus of claim 1, wherein the main path determination unit is conventional, and is configured to output a synchronous signal POS indicating the position of a main path signal in the received input signal based on the magnitude of the filtered first calculated power signal.

3. The apparatus of claim 2, wherein the main path determination unit outputs the synchronous signal POS to a phase calculator and to a synchronization locking controller.

4. The apparatus of claim 1, wherein the first multipath distortion filter comprises:

a shift register having a plurality j+1 of delays having a delay of a predetermined sample time T, each of which delays and outputs the first power signal, thereby generating a plurality of delayed first power signals;

a plurality j of multipliers configured to multiply each of the delayed powers by a corresponding filter coefficient and outputs a plurality j of products;

an adder that adds the plurality j of products;

a subtraction element that subtracts the sum, of products, output by the adder from a predetermined one of the j+1 delayed powers and outputs the difference as a determination signal.

5. The apparatus of claim 4, wherein the corresponding filter coefficients are set such that a path signal power among a plurality of multi path signal powers is summed to a maximum power within a one-symbol period and is determined as the main path signal.

6. The apparatus of claim 4, wherein the corresponding filter coefficients are set such that the main path signal power is identified at a pre-ghost signal power ahead of a maximum power among a plurality of multipath signal powers within a one-symbol period, or at a post-ghost signal power following the maximum power.

7. The apparatus of claim 1, wherein the main path determination unit determines the position of the main path signal when the first filtered power signal is larger than a predetermined threshold value.

8. The apparatus of claim 1, wherein the main path determination unit compares the first filtered power signal with a threshold value to identify the position of the synchronization sequence in the received input signal.

9. The apparatus of claim 1, wherein said received input signal is a digital television DTV signal that is encoded using amplitude modulation.

10. The apparatus of claim 1, further comprising:
a demodulator configured to delay the received input signal by a predetermined time;
a second power calculator configured to output a delayed second power signal based on the delayed received input signal;
wherein the main path detector further comprises:
a second multipath distortion filter configured to filter the delayed second calculated power signal and to output a second filtered power signal.

11. The apparatus of claim 10, wherein the second main path determination unit and is configured to output a synchronous signal POS indicating the position of a main path signal in the based upon the magnitudes of the first filtered power signal and of the second filtered power signal.

12. The apparatus of claim 11, wherein the second main path determination unit only outputs a synchronous signal POS indicating the position of the a main path signal if one of the first filtered power signal and the second filtered power signal exceeds a predetermined threshold power value.

13. The apparatus of claim 10, wherein the second main path determination unit outputs a selection signal SEL corresponding to which of the first filtered power signal and the second filtered power signal had the maximum value.

14. The apparatus of claim 1, further comprising:
a synchronization locking controller which counts symbols and segments of the main path signal and generates a synchronization locking control signal and a count information signal based on the counted results.

15. The apparatus of claim 14, wherein the count information signal comprises a symbol count signal and a segment count signal.

16. The apparatus of claim 14, further comprising:
a direction determiner which generates a field polarity signal based on the received input signal; and a synchronization signal generator which generates a segment synchronization signal for the received input signal and a plurality of synchronization signals using the synchronization locking control signal, the count information signal, and the field polarity signal, the synchronization signals being synchronized with the segment synchronization signal.

17. The apparatus of claim 16, wherein the synchronization signal generator is turned on or off in response to the synchronization locking control signal.

18. The apparatus of claim 14, further comprising:
a comparator that generates a locking cancellation control signal indicating whether a count obtained by counting received error values for a predetermined period of time is less than a threshold value;
wherein the synchronization locking controller determines the logic state of the synchronization locking control signal based on the locking cancellation control signal.

19. The apparatus of claim 1, further comprising a phase calculator that calculates a difference between the phase of a received input signal and the phase of the main path signal and generates the calculated result as a phase offset value for the received input signal, wherein the phase calculator calculates the phase of the received input signal using first correlation values for a real component signal and an imaginary component signal of the received input signal.

20. The apparatus of claim 19, wherein the phase calculator calculates the phase of the received signal using second correlation values for the real component signal and the imaginary component signal of the received signal.

21. The apparatus of claim 1, wherein the first power signal is obtained by adding the squares of first correlation values for a real component signal and an imaginary component signal of the received input signal.

22. A digital TV (DTV) reception apparatus comprising:
a demodulator which converts an analog Vestigial Sideband (VSB) signal extracted by a tuner into a digital signal and generates a real component signal and an imaginary component signal of the digital signal;
a synchronization signal detection circuit which determines a main path signal and a field direction signal based on correlation values obtained using the real component signal and the imaginary component signal and generates a phase offset value for the VSB signal, a segment synchronization signal, and a plurality of synchronization signals based on the determined main path signal and the determined field direction signal, the synchronization signals being synchronized with the segment synchronization signal;
wherein the synchronization signal detection circuit comprises:
a first power calculator that calculates a first power signal based on the real component signal and the imaginary component signal;
a main path detector that generates a main path position signal based on the calculated power signal.

23. The apparatus of claim 22, wherein the main path detector includes:
a first multipath distortion filter configured to filter multipath distortion from the first calculated power signal and to output a first filtered power signal; and
a main path determination unit that selects a main path position based on the filtered first calculated power signal.

24. The apparatus of claim 23, wherein the main path determination unit is conventional, and is configured to output a synchronous signal POS indicating the position of a main path signal in the received input signal based on the magnitude of the filtered first calculated power signal.

25. The apparatus of claim 23, wherein the main path determination unit outputs the synchronous signal POS to a phase calculator and to a synchronization locking controller.

26. The apparatus of claim 23, wherein the first multipath distortion filter comprises:
a shift register having a plurality j+1 of delays having a delay of a predetermined sample time T, each of which delays and outputs the first power signal, thereby generating a plurality of delayed first power signals;

a plurality j of multipliers configured to multiply each of the delayed powers by a corresponding filter coefficient and outputs a plurality j of products;

an adder that adds the plurality j of products;

a subtraction element that subtracts the sum, of products, output by the adder from a predetermined one of the j+1 delayed powers and outputs the difference as a determination signal.

27. The apparatus of claim 23, further comprising:
a second the main path detector including:
   a second multipath distortion filter configured to filter multipath distortion from a second calculated power signal and to output a second filtered power signal.

28. The apparatus of claim 27, wherein the main path determination unit selects a main path position based on the filtered first calculated power signal and based on the filtered first calculated power signal.

29. The apparatus of claim 27, wherein the main path determination unit is configured to output a synchronous signal POS indicating the position of a main path signal in the received input signal based on the magnitude of the filtered first calculated power signal and based on the magnitude of the filtered first calculated power signal.

30. The apparatus of claim 22 further comprising:
a phase calculator that calculates the phase of the VSB signal based on the real component signal and the imaginary component signal, calculates a difference between the calculated phase and the phase of a main path signal, and generates the calculated result as a phase offset value for the VSB signal;
a phase compensator which compensates for the phase of the real component signal using the phase offset value and outputs the compensated result;
an equalizer which filters the signal output by the phase compensator by compensating for distortion of the output signal of the phase compensator and outputs the filtered result; and
a decoder which performs an error correction operation on the signal output by the equalizer and outputs an error obtained during the error correction operation,
wherein the synchronization signal detection circuit generates a locking cancellation control signal using the error value, and it is determined whether to lock the synchronization signals according to the locking cancellation control signal.

31. The apparatus of claim 30, wherein the synchronization signal detection circuit generates a synchronization locking control signal whose logic state is determined according to the locking cancellation control signal, and the phase compensator and the equalizer are turned on or off according to the synchronization locking control signal.

32. The apparatus of claim 30, wherein the synchronization signal detection circuit comprises:
a comparator that generates a locking cancellation control signal indicating whether a value obtained by accumulating received error values for a predetermined period of time is less than a threshold value; and
a synchronization locking controller that determines the logic state of the synchronization locking control signal based on the locking cancellation control signal.

33. The apparatus of claim 30, wherein the demodulator delays a first complex signal comprising the real component signal and the imaginary component signal by a predetermined period of time, thereby generating a second complex signal comprising a real component signal and an imaginary component signal, the synchronization signal detection circuit generates a selection signal using the first power signal obtained from the first complex signal and a second power signal obtained from the second complex signal, the main path position signal and the field direction signal are determined based on a plurality of correlation values for one of the first and second complex signals selected according to the selection signal, and the phase compensator compensates for the phase of the real component signal of the selected complex signal.

34. A method of detecting a synchronization sequence within a received signal, the method comprising:
calculating a first power signal based on the received signal;
filtering the first calculated power signal to adjust for multipath distortion;
determining the position of a main path signal based on the filtered first calculated power signal.

35. The method of claim 34, further comprising:
calculating a difference between the phase of a received signal and the phase of a main path signal and generating the difference as a phase offset value for the received signal;
counting symbols and segments of the main path signal and generating a synchronization locking control signal and a count information signal based on the counted results;
generating a field direction signal based on the received signal;
generating a segment synchronization signal for the received signal and a plurality of synchronization signals using the synchronization locking control signal, the count information signal, and the field direction signal, the synchronization signals being synchronized with the segment synchronization signal; and
generating a locking cancellation control signal indicating whether a value obtained by accumulating received error values for a predetermined period of time is less than a threshold value; and
determining the logic state of the synchronization locking control signal based on the locking cancellation control signal.

36. The method of claim 35, wherein the calculating of the phase of the received signal comprises calculating the phase of the received signal using first correlation values for a real component signal and an imaginary component signal of the received signal.

37. The method of claim 36, wherein the calculating of the phase of the received signal comprises calculating the phase of the received signal using second correlation values for the real component signal and the imaginary component signal of the received signal.

38. The method of claim 35, wherein the count information signal comprises a symbol count signal and a segment count signal.

39. The method of claim 34, wherein determining the position of the main path signal comprises:
calculating the first power signal by adding the squares of the first correlation values for a real component signal and an imaginary component signal of the received signal;
generating a plurality of delayed first power signals, based on the first power signal, that are delayed and separated from one another by a predetermined sample time;
multiplying the delayed first power signals by respective corresponding first multiplication coefficients and generating a first determination signal based on the products thereof; and determining the position of the main path from the first determination signal if the first determination signal is larger than a threshold value.

40. The method of claim 34, wherein determining the position of the main path signal further comprises:
calculating a second power signal by adding the squares of correlation values for a real component signal and an imaginary component signal of delayed signal obtained by delaying the real component signal and the imaginary component signal the received signal by a predetermined amount of time;
generating a plurality of delayed second power signals that are delayed and separated from one another by the predetermined sample time;
multiplying the delayed second power signals by respective corresponding second multiplication coefficients, and generating a second determination signal based on the products thereof;
determining the position of the main path signal based which one of the first and second determination signals is greater than the other.

41. The method of claim 40, wherein the first and second multiplication coefficients are set such that the position of the main path signal is determined based on a maximum power among a plurality of delayed first and second powers within a one-symbol period.

42. The method of claim 40, wherein the first and second multiplication coefficients are such so that the position of the main path signal is determined at a pre-ghost power ahead of a maximum power among a plurality of delayed first and second powers within a one-symbol period, or a signal corresponding to one of a plurality of post-ghosts following the maximum power.

43. A DTV reception method comprising:
converting an analog VSB signal extracted by a tuner into a digital signal;
generating a real component signal and an imaginary component signal by demodulating the digital signal;
determining a main path signal and a field direction signal based on correlation values obtained using the real component signal and the imaginary component signal;
generating a phase offset value for the VSB signal, a segment synchronization signal, and a plurality of synchronization signals based on the determined main path signal and the determined field direction signal, the synchronization signals being synchronized with the segment synchronization signal;
compensating for the phase of the real component signal using the phase offset value and outputting the compensated result;
filtering the compensated result through distortion compensation and outputting the filtered result;
performing an error correction operation on the filtered result and outputting an error obtained during the error correction operation; and
determining whether to lock the synchronization signals according to a locking cancellation control signal.

44. The DTV reception method of claim 43, wherein the generating of the synchronization signals comprises:
calculating the phase of the VSB signal based on the real component signal and the imaginary component signal, calculating a difference between the calculated phase and the phase of a main path signal, and generating the calculated result as a phase offset value for the VSB signal;
calculating a power based on the real component signal and the imaginary component signal;
generating the main path signal based on the calculated power;
counting symbols and segments of the main path signal and generating a synchronization locking control signal and a count information signal based on the counted results;
generating a field direction signal based on the received signal;
generating a segment synchronization signal for the VSB signal and a plurality of synchronization signals using the synchronization locking control signal, the count information signal, and the field direction signal, the synchronization signals being synchronized with the segment synchronization signal;
generating a locking cancellation control signal indicating whether a value obtained by accumulating received error values for a predetermined period of time is less than a threshold value; and
determining the logic state of the synchronization locking control signal based on the locking cancellation control signal.

45. The DTV reception method of claim 43 further comprising:
generating a second complex signal comprising a real component signal and an imaginary component signal by delaying a first complex signal comprising the real component signal and the imaginary component signal by a predetermined period of time;
generating a selection signal using a first power obtained from the first complex signal and a second power obtained from the second complex signal;
determining the main path signal and the field direction signal based on correlation values for one of the first and second complex signals chosen according to the selection signal; and
compensating for the phase of the real component signal of the chosen complex signal.

* * * * *